J. P. WEIS.
STOCKING WELTING MACHINE.
APPLICATION FILED OCT. 11, 1909.
1,118,322.
Patented Nov. 24, 1914.
6 SHEETS—SHEET 3.
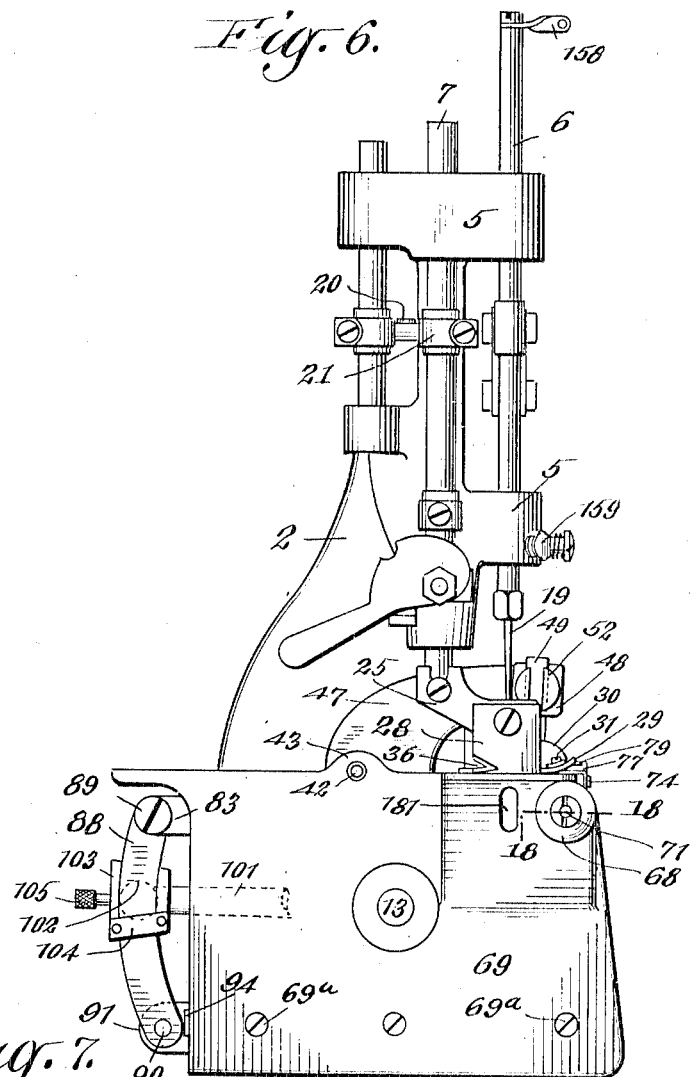
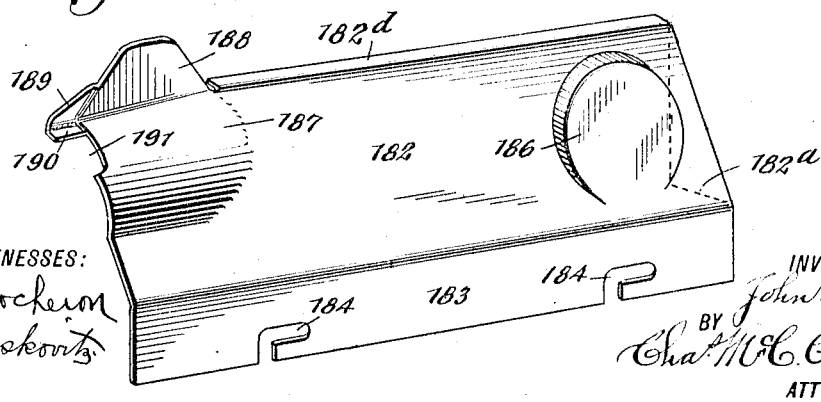

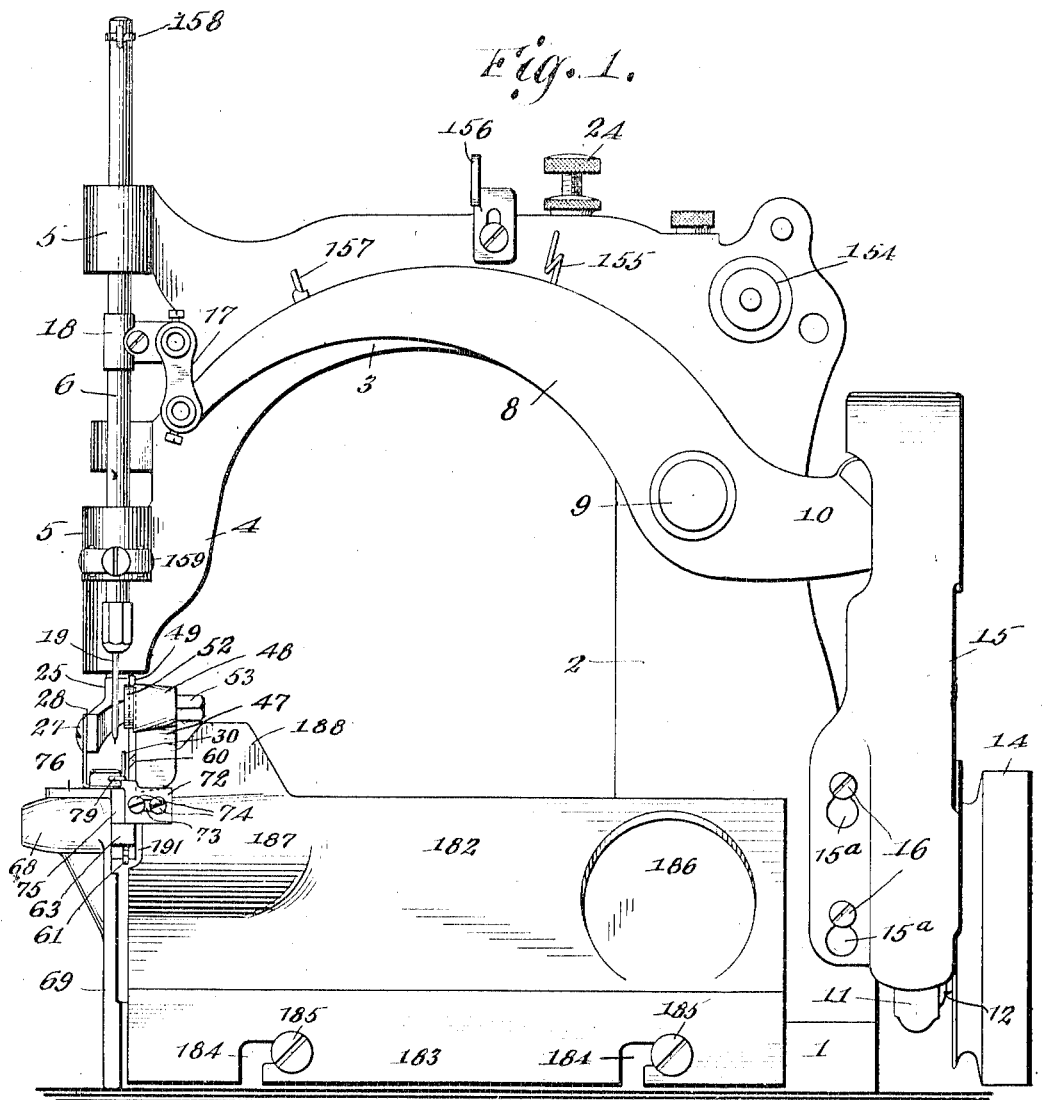

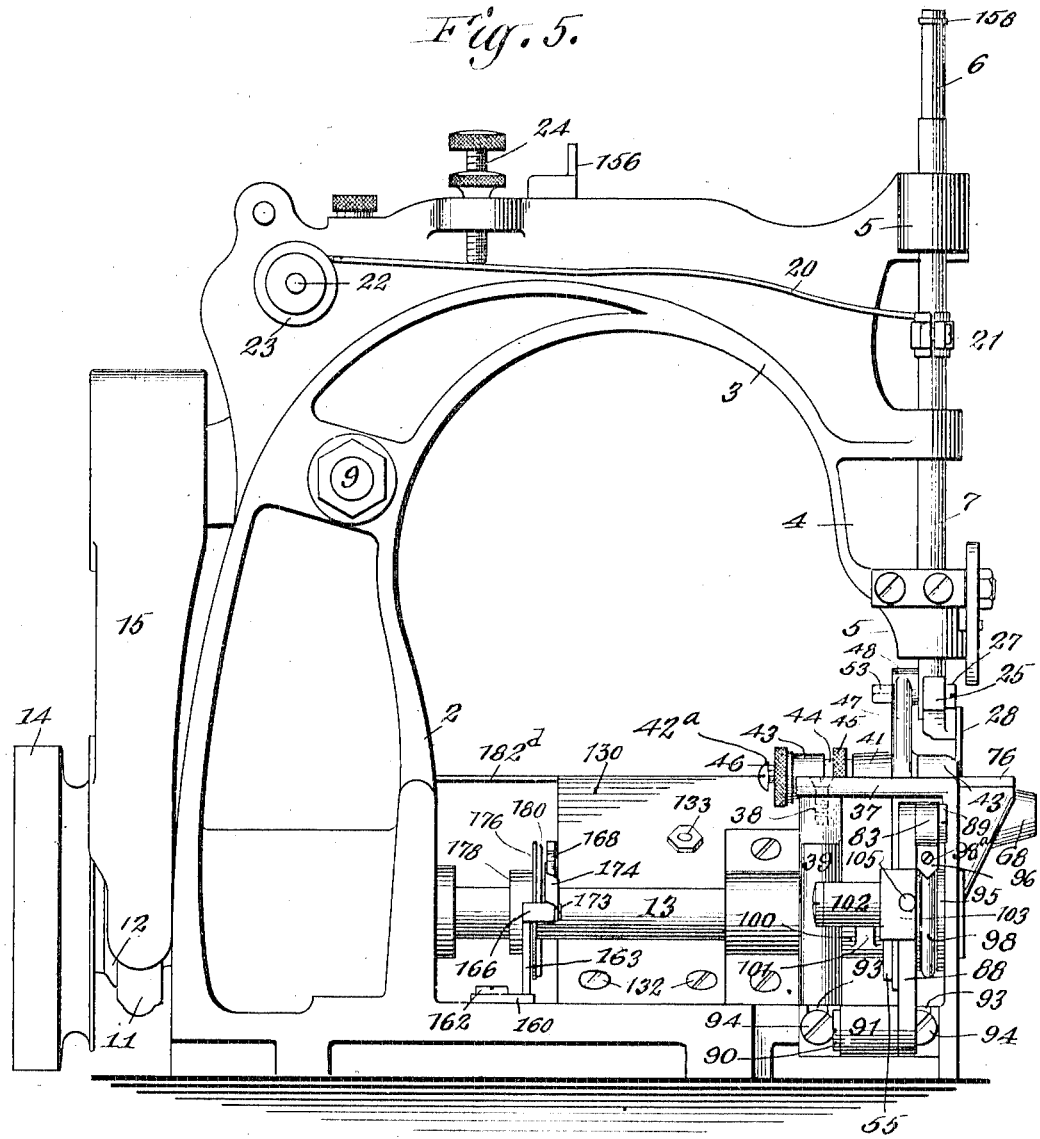

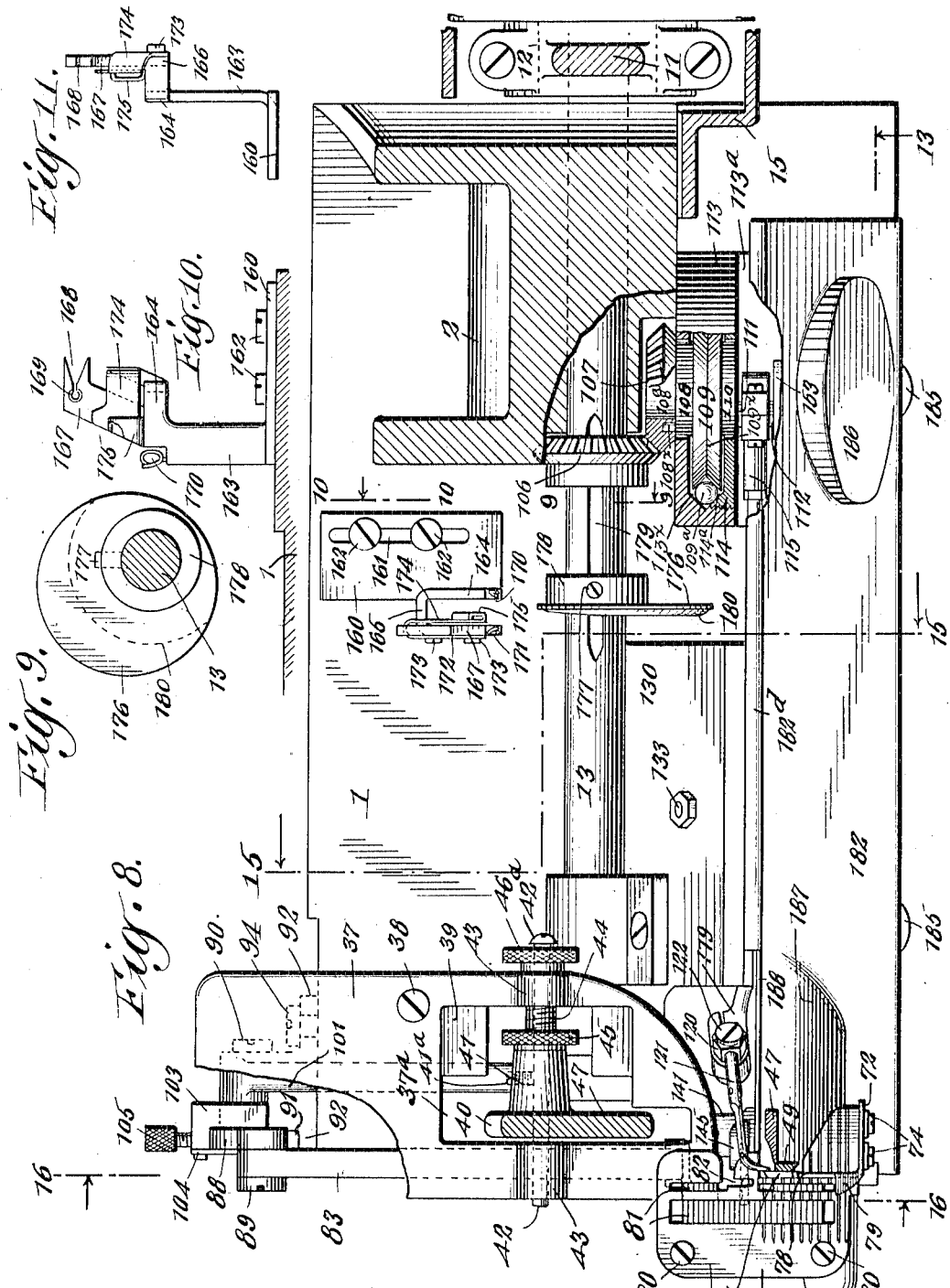

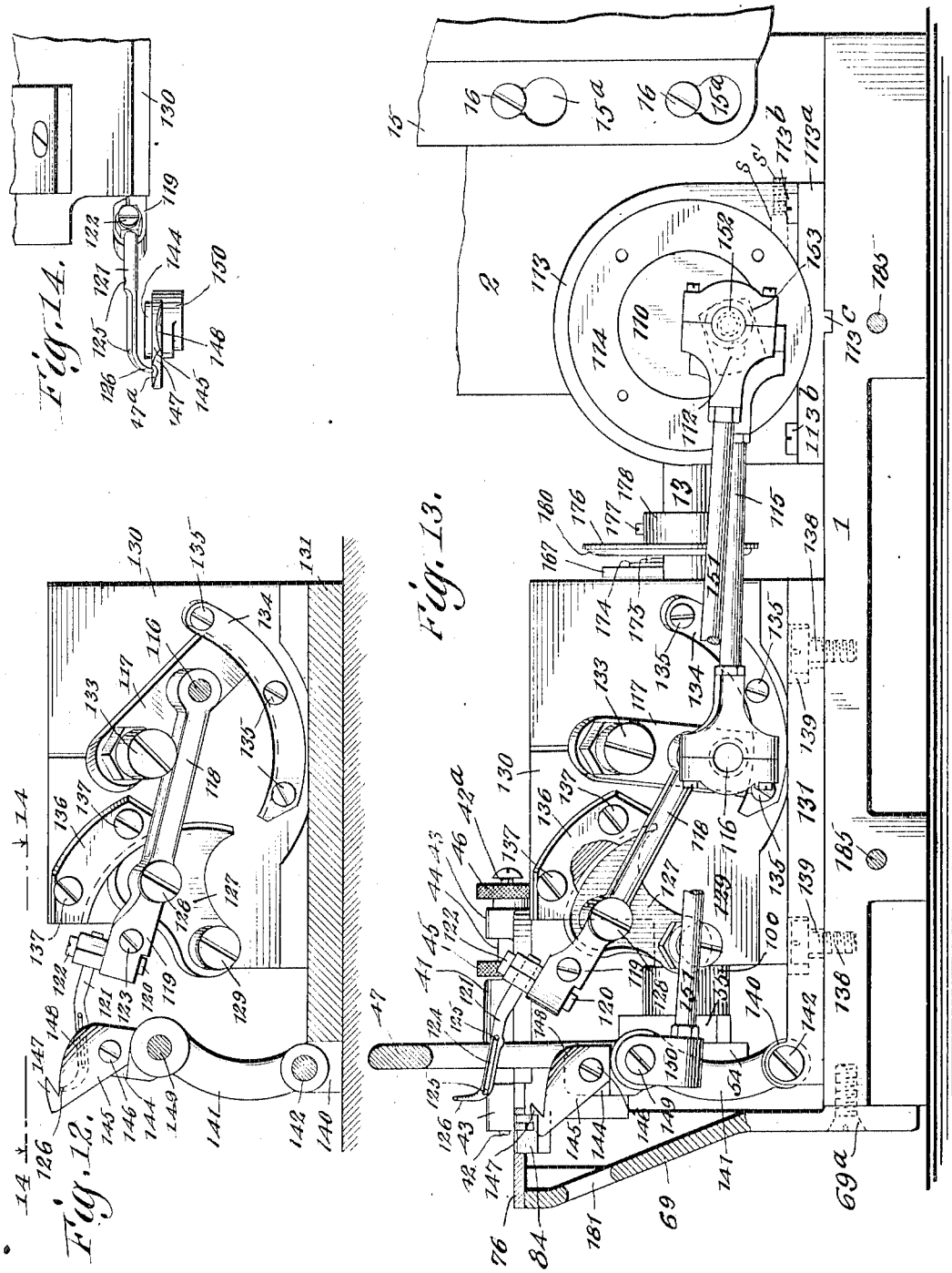

J. P. WEIS.
STOCKING WELTING MACHINE.
APPLICATION FILED OCT. 11, 1909.
1,118,322.
Patented Nov. 24, 1914.
6 SHEETS—SHEET 6.
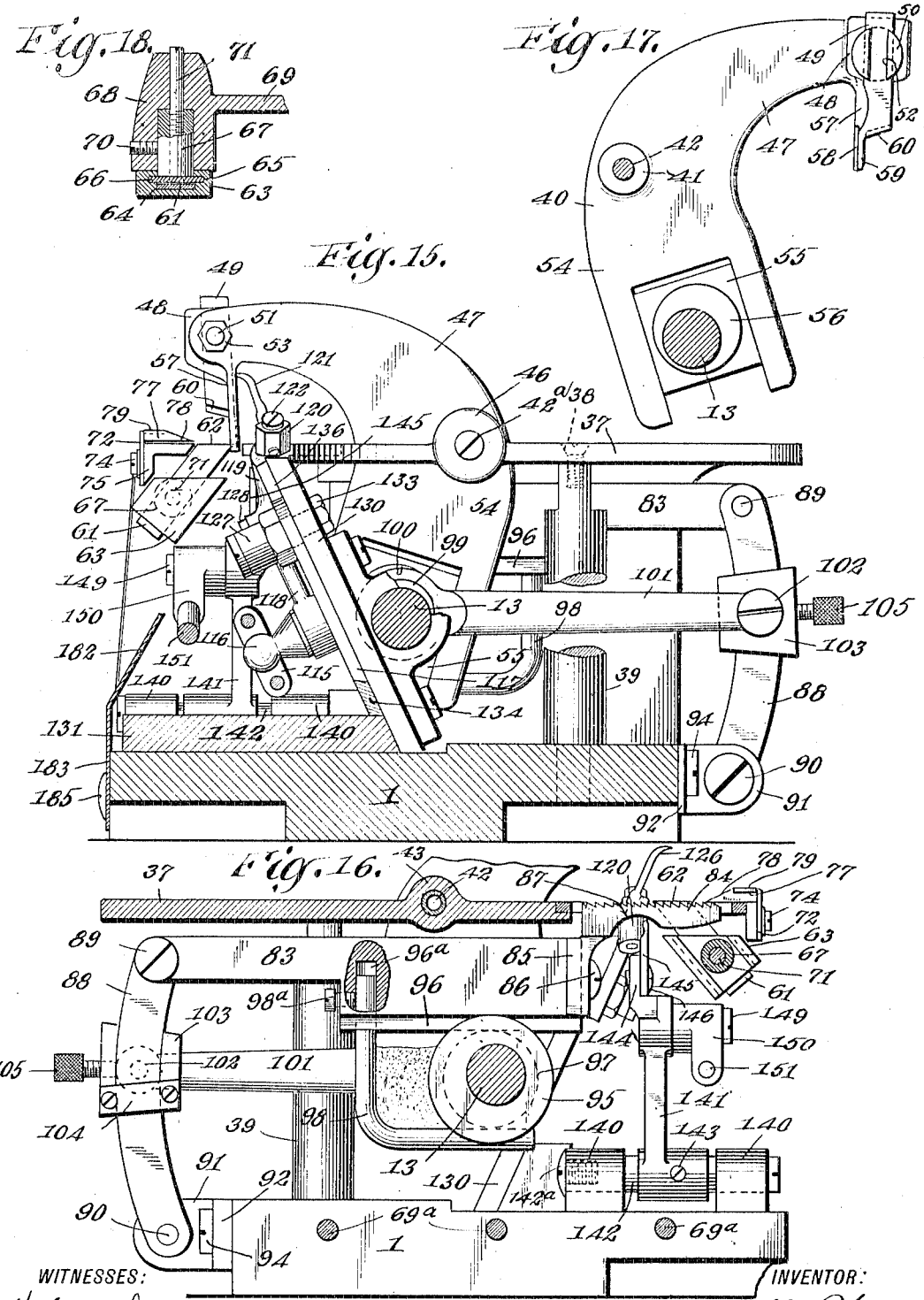

UNITED STATES PATENT OFFICE.

JOHN P. WEIS, OF NYACK, NEW YORK.

STOCKING-WELTING MACHINE.

1,118,322.   Specification of Letters Patent.   Patented Nov. 24, 1914.

Application filed October 11, 1909. Serial No. 522,158.

*To all whom it may concern:*

Be it known that I, JOHN P. WEIS, a citizen of the United States, residing in Nyack, county of Rockland, and State of New York, have invented a new and useful Improvement in Stocking - Welting Machines, of which the following is a description.

This invention relates to machines for overedge stitching or overseaming, and particularly to a machine adapted for overedging hemmed goods such as stockings and tubular garments, or other tubular articles, whether of knitted or woven fabric. The particular features of my present invention being adapted for simultaneously sewing and trimming tubular work, the machine containing the improvements having become known in the trade as a "stocking welter."

Among the objects of my invention may be noted the following: to provide a simple, easy-running, high-speed, overedge stitching mechanism for manipulating two threads so as to overstitch an edge or edges of the work and practically cover the trimmed edge; to provide a stitch-forming mechanism which is compact and cheap of construction, whereby the work can be accomplished with ease and facility in combination with a mechanism whereby the edge of the work can be trimmed in advance of the stitching, and the latter applied so as to effectively cover the trimmed edge and stitch it to the body of the material with an overedge stitch which shows on but one side of the work; to provide a stitch-forming mechanism including a looper and spreader operating mechanism of novel construction; to provide a sewing machine with a simple and effective trimming mechanism having a novel coöperative relation; to provide a system of elements or mechanisms so associated as to enable blind stitching to be produced on and over the edge of trimmed work; and to provide certain details of construction which coöperate to handle the work and threads and which, in their combination of individual and characteristic features, produce a novel machine.

In order that my invention may be clearly understood, I have provided drawings wherein:

Figure 1 is a front elevation showing the general form of my machine; Fig. 2 is a top plan view of the presser-foot detached from its bar; Fig. 3 is a perspective view of the work-guide; Fig. 4 is a side elevation of the presser-foot shown as attached to its bar; Fig. 5 is a rear elevation of the machine; Fig. 6 is a left end elevation of the machine; Fig. 7 is a perspective view of the cover and guard-plate; Fig. 8 is a top plan view of the work-plate with certain parts broken away to show details of construction and other parts shown in horizontal section; Fig. 9 is a section on the line 9—9, Fig. 8, showing in side elevation the take-up and thread-clamping disk fixed to the driving-shaft; Fig. 10 is a section on the line 10—10, Fig. 8, showing in side elevation the thread-clamp and guide for the spreader-thread, it being noted that Figs. 9 and 10 show the parts in coöperative relation; Fig. 11 is a front end elevation of said clamp and guide detached from the machine; Fig. 12 is a front elevation showing portions of the spreader and looper actuating mechanism; Fig. 13 is a front elevation showing the mechanism of Fig. 12 in its coöperative relation to its driving mechanism and the machine, the view being substantially along the line 13—13 of Fig. 8; Fig. 14 is a detail in top plan showing the spreader and looper in coöperative relation looking in the direction of the arrows from the line 14—14, Fig. 12; Fig. 15 is a vertical section of the machine taken substantially on the line 15—15, Fig. 8, looking in the direction of the arrows; Fig. 16 is a section on the line 16—16 of Fig. 8 looking in the direction of the arrows; Fig 17 is a side elevation of the trimmer-lever with its journal and driving-shaft in section; and Fig. 18 is a section substantially on the line 18—18 of Fig. 6 showing the details of construction of the means for supporting the ledger-blade of the trimming mechanism.

Referring to the drawings, the numeral 1 indicates the bed of the machine, 2 the vertical arm, 3 the overhanging arm and 4 the head carrying the bearings 5, in which the needle-bar 6 and presser-bar 7 operate. The needle-bar is actuated in usual manner by the needle-lever 8, fulcrumed at 9 to the vertical arm 2, and having the rear extension 10, connected by an eccentric strap 11, see Fig. 8, surrounding an eccentric 12 at its lower end, carried by the driving-shaft 13, which latter, at its outer end, adjacent the eccentric, has attached thereto the combined pulley and hand-wheel 14. The eccentric 12 and strap 11 are covered by the shield 15, having the key-hole slots 15ª for passage of the screws 16 for securing the shield to the machine. The forward end of the needle-lever 8 is pivotally connected by a link 17 with a collar 18 clamped to the needle-bar 6, which latter, at its lower end, carries the needle 19. The presser-bar 7 is held to its work by a spring 20, bearing at one end upon a collar 21, clamped to said bar, and at its other end bearing upon the spindle 22 of the tension-device 23, said spring being adjusted as to pressure by the adjusting-screw 24. The presser-bar, at its lower end, carries the shank 25, to which the presser-foot 26 is pivotally connected, as at 27, by its attaching-plate 28. All these parts are, or may be, substantially the same as found in the now well-known Metropolitan sewing machine and further detail description of them is deemed to be unnecessary. The presser-foot 26 has its forward end upturned as at 29, and thereto is adjustably secured the guard 30, by means of the screw 31 passing through the slot 32 in the shank of said guard. In the rear of the guard 30 is adjustably attached the tongue 33, over which the stitches are formed, the same extending rearwardly and parallel with the foot and located substantially in the line of feed. This tongue is attached to the foot by means of the screw 34, passing through the elongated slot 35, thus enabling the tongue to be laterally adjusted on the foot so as to regulate the degree of tension of the stitches and accommodate the width of seam desired. The rear edge of the attaching-plate of the presser-foot adjacent the latter is provided with a V-shaped notch 36, the edges of which are sharpened so as to be sufficiently keen to cut the thread, or line of stitches, when the same is brought into contact therewith, which is readily done by moving the same rearwardly after the work has been passed from under the presser-foot. In rear of the stitching position, see Fig. 8, the machine is provided with a top-plate, the same being secured by means of a screw 38 to one of the standards 39 of the machine-bed and one of the functions of which top-plate 37 is to support the trimmer-lever 40, the details of which are shown in Figs. 15 and 17, said trimmer-lever operating in the slot or opening 37ª of said top-plate. The trimmer-lever 40 is provided with the hub 41, through which extends the journal-pin 42, supported in the opposite bearings 43 of said top-plate 37, said lever being secured to said pin 42 by screw 41ª, and being free to move laterally with said journal-pin but held in adjusted position by means of the screw-threaded bushing 44, sleeved upon said pin 42 and working in the adjacent bearing 43 of the top-plate, said bushing being provided with the knurled head 45, which engages the hub 41 of the trimmer-lever. The bushing 44 has screwed upon its outer end the binding-nut 46, which engages the side of the adjacent bearing 43 of the top-plate 37, to limit the adjustment of the bushing 44 and, consequently, hold the trimmer-lever and bushing from lateral movement. To enable control of the adjustment of the trimmer-lever in opposite directions to be maintained, a head 42ª is provided on the inner end of the journal-pin 42, said head being in the form of a screw threaded into the end of said pin. Hence, adjustments of the trimmer-lever 40 can be made and maintained, in one direction to regulate the pressure of the trimmer-blade against the ledger-blade and in the opposite direction to regulate the width of trim or width of seam, the said head 42ª operating as a limit and enabling the trimmer-lever to be readily shifted. The trimmer-lever, at the forward end of its overhanging arm 47, is formed with a grooved head 48, in which is set the trimmer-blade 49, for longitudinal adjustment, said blade being carried in the grooved head 50, of a bolt 51, said bolt-head having the flanges 52, which engage said trimmer-blade and clamp the same tightly to the grooved head 48 of the arm 47, the bolt-head resting in a socket of lever-head 48 and being adjusted and held in place by the nut 53 threaded on the rear end of said bolt, see Fig. 15. The lower arm 54 of the trimmer-lever is bifurcated and between the forks thereof a block 55 operates, the same being actuated by the eccentric 56, carried by the driving-shaft 13.

To prevent the trimmer-blade 49 from being displaced by accident or undue pressure or strain thereon, the head 48 is provided with the depending-portion 57, having the laterally-extending flange 58, coöperating with the depending-finger 59, for guiding the trimmer-blade so that its cutting edge 60 will properly coöperate with the ledger-blade 61. The flange 58 also coöperates with the depending-finger 59 of the trimmer-blade to prevent the latter from being pushed rearwardly too far back or broken off under any circumstance, thus insuring the proper sliding engagement of the cutting edge 60 with the cutting edge 62 of the ledger-blade 61, which latter is supported by the block 63, which is grooved at 64 to receive said blade, as shown in Fig. 18. Adjacent said groove 64 is a wider groove 65, which receives the head 66 of an internally screw-threaded sleeve 67, which slides freely in the horn-shaped extension 68 of the end wall 69 of the machine, said sleeve being held in place by means of the screw 70, screwing into said horn and impinging against the said sleeve. By this means, the block or holder 63 is firmly held against the horn 68 and the ledger-blade 61 is given its general location in the machine. Vertical adjustments of the ledger-blade 61 are secured by means of the screw 71, passing through the horn 68, and threaded into the sleeve 67, and at its forward end impinging against the ledger-blade 61, so as to press and bind the same tightly against the flat wall of the groove 64 of the block or holder 63. The trimmer-blades operate in advance of the stitch-forming mechanism and perform the function of trimming the edges of the work in advance of the overedge stitching, which latter binds the trimmed edge as the work is fed through the machine. Located in advance of the trimming mechanism and coöperating with the ledger-blade thereof is the adjustable edge-guide and work-retainer shown in detail in Fig. 3 and illustrated from different sides in Figs. 8, 15 and 16, said device consisting of the attaching-plate 72, provided with an elongated slot 73, through which pass the binding-screws 74, screwed into the depending-portion 75 of the throat-plate. The attaching-plate is provided with a guiding-finger 77, arranged at a right-angle thereto and extending forwardly parallel with the line of feed and from the upper edge of said attaching-plate said finger being tapered to a point, as at 78, and being provided, between its ends, with an overhanging, work-retaining ear 79. The finger guides the edge of the material and its beveled, pointed end extends in line with the ledger-blade and approaches the forward edge of the latter, as clearly shown in Figs. 8, 15 and 16, it being understood that, in the operation of the machine, the guide leads the fabric, directly to the trimmer-blades and under the presser-foot, the trimmer trimming the edge of the work and thus preparing the same for the binding stitches of the overedge-stitching mechanism. The plate can be adjusted laterally by means of the slot 73 and screws 74 so as to regulate the depth of the overedge stitching or width of the latter, and also the amount of trimming the work is to have preparatory to the stitching. The adjustment of the guide may also be such as to enable blind-stitching to be produced, since the position of the guide-portion 77 will determine whether the needle shall penetrate the several pieces of work from side-to-side or merely pass through the top piece and into one side and out of the same side at the fold of the lower piece of work. The ear 79 holds the fold of the work down upon the work-plate and prevents the edge thereof from springing out of position, or being improperly trimmed by the trimming mechanism.

The work-plate 76 is held in position on the end-plate 69 of the machine by means of the screws 80, and this work-plate supplements the horn 68 in supporting the work, said plate 76 being provided with a plurality of elongated slots through which the serrated feeding surfaces 81 of the feed-dog operate and also being provided with an open-sided slot 82 for the operation of the needle and for the free movement of the threads of the stitch. It will be noted that this work-plate is not extensive and that it projects laterally beyond the front end of the machine and over the further extending horn 68. Hence, there is clearance all around the said plate and horn, which gives freedom of movement for manipulating the work and enables tubular articles to be freely fed and extended up to the feed and stitching position.

The feeding mechanism clearly shown in Figs. 5, 6, 8, 15 and 16 is specially constructed to coöperate with the trimmer and stitch-forming mechanism and other peculiar parts of my present machine, and consists of the feed-bar 83, carrying at its forward end the feed-dog 84, which extends from the end of the bar toward the front of the machine at a right-angle to and from the top of its attaching-shank 85, which is secured to the bar by means of the screw 86, in any suitable manner, whereby it may be adjusted vertically, as usual. Viewing Figs. 8 and 16, it will be seen that said feed-dog 84 is offset laterally from its bar or toward the left end of the machine. By extending the dog forward, as shown in Fig. 16, room is given for the operation of the looper and the bottom of the dog is cut out vertically at 87, so as to permit the looper to be approached quite close to the bottom of the work-plate, as will be readily understood. The feed-bar 83 is pivotally connected at its rear end to the curved lever 88, by means of the screw 89, which lever, at its lower end, is journaled at 90 between the arms 91 of the supporting-bracket 92, which is provided with vertical, open-end slots 93, through which pass screws 94, for attachment of the bracket to the bed-plate 1 of the machine. This construction enables the bracket, with its lever 88, to be properly adjusted and set in the machine and makes the feeding mechanism a detachable device capable of being applied to any similar form of machine. This construction also enables the feed-bar to be tilted so as to cause its dog to engage the work either wholly in front of or wholly behind the path of reciprocation of the needle, or to engage the work with firmer grip in front of the needle than behind the same, or vice versa, according to the degree of tilt given the dog by adjusting the bracket 92, in the same manner as set forth in my prior application Serial No. 153,907, filed April 23, 1903. The rise and fall of the feed-bar is imparted by means of the grooved eccentric disk 95, carried by the driving-shaft 13, the depending V-shaped portion 96 of the feed-bar being received in the groove 97 of said disk, the two coöperating to prevent any relative lateral movement. A depending, angular arm 98 engages in the groove 97 of the eccentric 95 opposite the portion 96, and the feed-bar is thus given a positive rising and falling motion. The arm 98 is adjustable vertically in socket 96$^a$ of the feed-bar by a screw 98$^a$, this enabling any wear which may occur between the bar, arm and eccentric to be taken up or compensated for. It will be seen that all possibility of rattling is eliminated and that the feed-mechanism is capable of high-speed. Longitudinal reciprocations are imparted to the bar by means of the eccentric 99, surrounded by the end 100 of the strap 101, the rear end of which is pivotally connected at 102 to a sliding-shoe 103, which receives in a groove thereof the curved lever 88. The shoe is retained upon the lever by means of the cross-piece 104, the two embracing said lever, and adjustments of the shoe along the lever are secured by means of the screw 105, which passes through the rear wall of said shoe and engages the rear edge of the said lever. The eccentrics are so timed that the usual four motions will be imparted to the feed-dog for engaging, progressing, receding from and moving into position to again engage, the work. From the foregoing description, it will be seen that the feed mechanism has been materially simplified and reduced to the least possible elements and that, in consequence, its action is easy, smooth and rapid. It will also be seen, viewing Figs. 5 and 8, that the feeding mechanism has been so constructed, as to enable it to be placed at the extreme end of the work-plate and that the lateral offset of the feed-dog disposes the latter so as to overhang, or project beyond the end of, the machine. This, with the arrangement of the work-plate 76 and horn 68, is an important combinative feature of my present invention. Also, it is to be noted that the mode of supporting the trimmer-lever and the ledger-blade is such, in combination with the structure of the trimming mechanism, as a whole, as to enable a very close relationship to be established between it and the stitch-forming mechanism and feeding mechanism at the extreme end of the machine, all of which aid in the production of my improved machine and make the same practical for the special purposes pointed out.

The looper and spreader mechanisms have been materially simplified, as will be seen by reference to Figs. 8, 12, 13, 14, 15 and 16. The main shaft 13 has set upon it a bevel-gear 106, meshing with a bevel-gear 107, carried by a disk 108, provided with an enlarged, circular, grooved portion 109, and on the opposite side of the latter with a smaller circular portion 110 similar to 108, the portion 110 carrying the crank 111, the outer end of which is extended from a second crank 112. The bevel-gear 107 is supported upon a bearing 108$^a$ of the disk 108, and the driving engagement is secured by a pin 108$^x$ on said disk 108 entering a corresponding socket in gear 107. Further details of this construction have not been given, since no claim is made thereto in this case but in my companion case filed of even date herewith, where all details are shown. The bevel-gear, with its triplex driving-disk is held in place by the bracket 113, and the coöperating screw-threaded face-ring 114. The bracket 113 is connected by its base 113$^a$ to the bed 1 by means of screws 113$^b$, a rib 113$^c$ guiding and setting the same properly in place in the base by coöperating with a groove in the latter. The disk-portions 108 and 110 are centered in the bracket and face-ring and the latter is provided with an inner circumferential bevel 114$^a$, corresponding to the opposing, circumferential bevel 113$^x$ of the bracket, the two beveled surfaces thus making a V-shaped race for the reception of ball-bearings 109$^a$, which support the enlarged portion 109, and in the groove 109$^x$ of which said balls are received. The adjustment of the face-ring will produce the proper coöperation between the parts and take up any lost motion of wear. A shoe $s$ and adjusting-screws $s'$ may hold the ring fixed. The crank 111 has connected to it, by any suitable means, one end of the pitman 115, the opposite end of which is connected by an ordinary ball-joint 116, the pin of which extends from a radius-bar 117, through the inner end of the spreader-lever 118, carrying at its outer end, in the clamp-portion 119, the socket-pin 120, the latter, in its upper end, having the shank of the spreader 121 clamped therein by the screw 122, a screw 123 binding the socket-pin in place in the clamp 119. By this means, the spreader 121 is given a triplex adjustment, vertically by the socket-pin 120 in the clamp 119 and circularly and longitudinally in the socket-pin by the screws 122. The spreader is of the thread-carrying variety, being provided in one face with the groove 124, at opposite ends of which are thread-eyes 125, the spreader, at its outer end 126, being laterally and vertically turned, as shown in Figs. 8 and 13. The spreader-lever 118 is mounted upon a radius-plate 127, by means of the journal-pin 128, said plate being journaled at 129 to an inclined supporting-plate 130, the lower edge of which is securely bolted to a base-plate 131, by means of one or more bolts 132. The bar 117 is pivoted at its upper end by means of the pin 133 to the upper end of the inclined plate 130, and the lower end of said link slides in the race formed between the said plate 130 and the curved bar 134, secured to said plate by the screws 135, the connection 116 of the pitman 115, radius-bar 117 and lever 118 being between the ends of said bar 117. The radius-plate 127, at its upper end, slides in the race formed between the inclined plate 130 and the curved bar 136, secured to said plate by means of screws 137. By this construction, the support and operation of the spreader is rigid, positive and without loose or lost motion, and vibration and chattering are entirely eliminated. The inclination of the mechanism, as shown in Figs. 15 and 16, gives a tilt to the spreader, the effect of which is to enable the latter to coöperate properly with the looper and the needle to engage a loop of needle-thread carried by the looper, and present its own thread to the needle above the work so that the strands of needle-loop will be properly disposed on the edge of the work, while the strands of the spreader-loop will be carried obliquely from back to front of the needle. As stated, the plate 130 is secured to the base-plate 131, the latter in turn being secured to the bed-plate 1 of the machine by means of screws 138, passing through enlarged apertures in said plate, as shown by dotted lines 139, in Fig. 13. This enables the base-plate, with all its important parts, to be adjusted universally in a horizontal plane on the bed-plate of the machine so as to position the spreader and looper mechanism properly relatively to the feeding mechanism and the needle. The adjusting means are shown in this case only in dotted lines, since the same forms no part of the present invention, but is made the subject of claim in my companion case filed of even date herewith. At the forward end of the base-plate 131, journal-bearings 140 are provided, in which is journaled the looper-carrier 141, by means of the pin 142, to which the carrier is fixed by means of the screw 143, the said carrier being provided with a vertical portion 144, to which is secured the shank of the looper 145, by means of the screw 146, passing through said shank and into the said vertical portion, the looper having, at its upper end, the rearwardly-pointed hook 147, for engaging the loop of the needle-thread, and in advance of the hook, just above its point of attachment to the looper-carrier, having a beveled needle-deflecting portion 148, to prevent the point of the needle in its descent from engaging the shank of the looper thus avoiding possibility of bending or breaking the needle, or injuring the looper.

Near its top, the looper-carrier is provided with the laterally-extending journal-pin 149, upon which swings the connection 150, to the lower end of which is adjustably connected the pitman 151, which at its rear end is connected by the usual ball-joint 152, to a crank-plate 153, shown in dotted lines in Fig. 13 and in full lines in Fig. 8, the other end of which plate is journaled, as previously stated, to the outer end of the pin 112. Thus, the spreader and looper are driven from the same prime-mover or driving-gear connected with the main shaft; but, by reason of the intermediary of the crank-plate 153, the proper timing between the spreader and looper are obtained so that the looper, in its rearward movement, engages the loop of needle-thread as the needle is moving upward and the spreader moves forward to engage the loop of said needle-thread and lift the same from the hook of the looper across the edge of the work-plate. This mechanism makes a noiseless, positive, easy and rapid running driving mechanism for the looper and spreader, as will be readily understood. The screw 143, which secures the looper-carrier to the pin 142, permits adjustment of said carrier laterally on said journal-pin, clearance at opposite sides of said carrier between the bearings 140 permitting such adjustment. The pin 142 may be screw-headed, as shown at the right of Fig. 16, and its opposite end is socketed for the reception of the screw 142$^a$, which, with the head at the opposite end, holds the journal-pin in place.

As will be seen, the stitch-forming mechanism produces a two-thread overstitch by manipulating a needle and a spreader-thread, the needle-thread being led from a usual supply through the tension-device 154, thence through a thread-eye 155, carried by the needle-lever 8, thence through guide 156 adjustable on arm 3, and thence to a thread-eye 157, carried by the needle-lever near its forward end, thence to a thread-guide 158, mounted on the upper end of the needle-bar, and thence through the thread-clamp and guide 159 on the lower bearing 5 of the machine-head, and thence to the eye of the needle; while the spreader-thread passes from the usual supply through the tension-device 23 and thence through a combined thread-clamp and pull-off, the carrying-plate of which is indicated by 160, see Figs. 8, 9, 10 and 11, and thence directly to the rear eye 125 of the spreader. The carrying-plate 160 is provided with the longitudinal slot 161, through which passes screws 162 into the bed-plate of the machine, thus securing the said plate 160 adjustably to the machine-bed. The carrying-plate 160 is provided with the post 163, which, at its upper end, is extended laterally, as at 164, parallel with its carrying-plate 160, and thence curved at a right-angle horizontally at 165, and then again bent into parallelism with the portion 164, as indicated at 166, from which latter portion, at its forward end, extends the inclined guide-arm 167, in the rear edge of which is formed a V-shaped notch 168, terminating in the thread-eye 169. The vertical post 163, at its upper end, is provided with the thread-eye 170, and directly opposite the same, on the forward end of the horizontal portion 166, a like thread-eye 171 is set. On its front side, the horizontal portion 166 has clamped thereto the shank of a spring 172, by means of screws 173, said spring being curved at its rear end around the inclined arm 167 and extended forwardly, as at 174, to the front edge of said inclined arm, where said spring is formed into or provided with an enlargement 175, which stands within the space between the two horizontal arms 164 and 166. The spreader-thread, extending from the tension 23, runs to the thread-guide 170, thence to the thread-guide 171, thence upwardly between the spring-portion 174 and the inclined arm 167, to the thread-eye 169, and thence forward to the rear thread-eye of the spreader. Thus, a strand of spreader-thread extends between the two thread-guides 170 and 171, in which position said strand is engaged by the combined take-up and pull-off disk 176, carried on the driving-shaft 13 and secured thereto by means of the screw 177, passing through its supporting-collar 178, and engaging in the spot-groove 179 of said shaft. The swing of the take-up disk 176 causes its periphery to first engage the thread passing between the two thread-guides 170 and 171, while the thread-clamp is open, thus controlling the slack of thread extending between said thread-clamp and the spreader, but, in the further movement of said disk, the face-cam 180, carried by said disk, will engage the projection 175 of said spring, thus forcing the latter laterally into engagement with the thread and clamping the latter firmly against the inclined extension 167 of the thread-guide. While the thread is thus clamped, no slack can be drawn from the direction of the spreader, but a supply is directly drawn from the tension between the latter and said thread-clamp. This furnishes the necessary supply for the stitch next to be made and relieves the spreader from imposing strain upon the said thread. By the construction just described, it will be seen that a simple, compact, positively-acting and rapid device is provided, having the triple functions of taking up slack, pulling off thread and clamping and unclamping the same so that the pull-off and take-up actions can be accomplished at the proper time.

Owing to the character of work performed by my machine and the shape of the work-support necessarily entailed thereby, the looper, in its forward movement, passes slightly beyond the end wall 69 of the frame, for which purpose an aperture 181 is provided, see Figs. 6 and 13, through which the heel of the looper may project in operation, said front wall being, at this point, outwardly and upwardly inclined, as shown in Figs. 1, 5, 6 and 13. As shown in Figs. 5, 6 and 13, the end wall 69 is formed integral with the top plate 37, and is secured in place by several screws 69ª, passing through the same into the end of the bed-plate 1, the combined top and end plates being thus rigidly secured in place and affording a very firm and substantial support for the trimmer-lever 40, so that the vibration of the latter cannot cause any vibration or chattering in the machine.

As seen particularly in Figs. 1, 7 and 8, a front cover-plate is provided, the upper portion 182 of which is inclined relatively to its vertical base-portion 183, which latter is secured to the front vertical edge of the bed-plate 1 by means of the open-end, angular slots 184, extending from the lower edge of said vertical portion 183. These slots admit the shanks of screws 185 and, after passing through the vertical portion thereof, said shanks pass to the closed end of said slots when the cover-plate is moved toward the front end of the machine. The screws are then clamped tightly upon the vertical portion 183 of the cover-plate to hold the same firmly in position. At its rear end, the cover-plate, in the inclined portion 182, is provided with the circular bulge 186, in the concavity of which the crank mechanism 112, 152 and 153 operates, the said bulge giving perfect freedom of movement and preventing contact of the inclined portion 182 of the cover-plate with said mechanism. At its forward end, the cover-plate is provided with the semi-circular convexity 187, given for the purpose of covering and avoiding the looper and looper-carrier in their operation, and formed in extension thereof is a substantially vertical portion 188, which prevents the trimming cut from the edge of the work from passing over the top of said cover-plate and becoming entangled with the operating mechanism. At the forward end of the said extension 188 and convexed portion 187, the cover-plate is provided with an angular extension with which engages the trimming as it passes from the trimming-blades, there being a vertical portion 189 for the purpose and a horizontal portion 190, which prevents said trimming from falling below the cover-plate. Adjacent the said angular extension, a notch 191 is provided in the end of the convexed portion 187, in which the trimmer-blade 49 operates. Thus, it will be seen that the convexed portion 187, vertical extension 188 and angular extension 189—190, operate both as a guard and shunt for the trimming, which is severed from the edge of the work by the trimming mechanism.

At the rear end of the cover-plate the inclined portion 182 is bent rearwardly at a right-angle to provide the portion 182ª, as shown in dotted lines in Fig. 7, which covers the ends of the pitmen 115 and 151 and their actuating mechanism. By constructing the cover-plate as shown and extending its upper horizontal edge 182ª into coöperation with the inclined supporting-plate 130, see Fig. 8, all the important parts carried by the bed-plate are protected from dust and lint and whatever oil may be flirted by said parts will be prevented from reaching the work or the operator, danger to the latter, from rapidly-running parts, being also avoided.

From the foregoing description, the following brief exposition of the mode of operation will be readily understood: The rotation of the driving-shaft will vibrate the trimmer-lever 40, through the medium of the slide-block 55 and eccentric 56, the eccentric 99 operating the pitman 101 and driving the segmental lever 88, which in turn drives the feed-bar 83, the eccentric and angle-arm 98 giving the vertical rise and fall to the feed-bar, thus causing the work to be fed up to the trimmer and the stitch-forming mechanism. The latter has its needle-bar driven by the eccentric on the driving-shaft, actuating the strap 11, which operates the needle-lever 8, while the double crank mechanism, operated from the bevel gearing on the driving-shaft, operates the two pitmen 115 and 151 to respectively actuate, through the intermediate connections, the spreader and looper. The work, if it be a stocking, or similar tubular work, the top of which is to be hemmed, trimmed and stitched, has its top hemmed as a preliminary to the trimming and stitching and the doubled portion is then again doubled at the edge of the work and the three superposed portions, with the free edge on top, are placed upon the work-plate and over the horn thereof under the presser-foot, with the folded and single edge superposed and lying against the guide 77 and under the overhanging-portion 79 of the latter. The guide will be so adjusted that a portion of the free edge, which is to be trimmed, will lie directly in the path of the trimming-blades. Thus, as the work is fed along, the trimming mechanism will sever a narrow portion from the edge of the work, which will pass forward into engagement with the shunt-guide and guard 188, 189, 190, and will slide over the convexed portion 187 and down the inclined portion 182 of the cover-plate, the main body of the work passing forward to the stitching mechanism. The needle will descend and first penetrate the trimmed edge and then the doubled portion of the work close to the bend thereof, and, having passed through the work-plate to its lower extreme, will retrograde and throw out a loop. At this time, the looper will move rearwardly and its hook 147 will engage the needle-loop and carry the same rearwardly so that the spreader, in its combined forward and vertical movement, will pass close beside the looper at the base of its hook in the depression 147ª, see Fig. 14, so as to reach directly under one strand of the loop extending from said hook to the work. The point of the spreader engages this rear strand of the loop and lifts the same vertically into engagement with the edge of the work and moves forwardly into said loop, which latter is prevented from being carried forward and is caused to slide rearwardly on the body of said spreader by its engagement with the edge of the work and the tongue 33 of the presser-foot. The spreader passes forward through the loop over the edge of the work and, in so doing, passes its thread through said loop into position for entrance by the needle, this occurring as the spreader moves rearwardly, thus causing its thread to be bowed out into the path of the needle. Thus, the needle-thread is caused to hold the spreader-thread in loop form on the top surface of the work, while the spreader-thread is caused to hold the needle-thread in loop form across the bottom surface and edge of the work.

According to the adjustment of the edge-guide 77, the work will be either blind-stitched with an overedge stitch, or over-stitched with one thread showing on the top surface.

At this point, it is important to lay stress upon the combinative arrangement of the elements and mechanisms of my new machine, the ultimate result of which is to perform certain important operations upon tubular work of both large and small diameter; that is to say, stockings, sleeves and other similar tubular work must be trimmed and the trimmed edge sewed to the body material, and this must be accomplished with an overedge stitch, which will have the effect of binding down and covering the raw edges which have been trimmed and, in certain instances, of so performing this function as to avoid all showing of the threads of the stitches on the fair surface of the work, by this meaning that a blind stitch of overedge variety is produced. This important functional operation and effect upon the work can well be produced by a combination of elements and mechanisms such as disclosed herein, including a work-support comprising a laterally-projecting throat-plate and adjacent horn, a feeding-device having its feeding-dog projecting laterally from its bar and working through said throat-plate beyond the frame of the machine, said feeding-device being located at one extreme end of said frame, and a trimming mechanism located also at one extreme end of the said frame and having its functional elements operating adjacent one edge of the said throat-plate, and a stitch-forming mechanism also operating adjacent one edge of said throat-plate and in rear of the functional elements of the trimming mechanism. And it is important to note that the feeding-device operates almost entirely at one side of a plane extending transversely of the work-support and cutting the longitudinal axis of the needle-bar, and that the major portion of the throat-plate projects laterally from the frame of the machine on the same side of said plane. This enables the work to be manipulated entirely on one side of the stitching position and beyond the end of the machine-frame without possibility of interference between the latter and the work. This also avoids any possibility of the work dropping upon, or coming in contact with, any of the moving or running parts of the driving mechanism of the machine elements and insures absolute cleanliness and unsoiled work, allowing also perfect freedom in the manipulation of the work by the operator, who can, at one and the same time, maintain the same with one hand in proper position relative to the work-guide and functional elements of the machine and, with the other hand, support the body of the work and manipulate it so that desired results may be obtained. Therefore, the combinative arrangement of elements and mechanisms as described and claimed are important.

Having thus described my invention, what I claim and desire to secure by Letters Patent is:

1. In combination with the frame of a sewing machine having a top-plate and an end-wall formed in one piece; stitch-forming mechanism; feeding mechanism; and trimming mechanism; the feeding mechanism being located at the extreme end of said frame adjacent the end-wall and under the top-plate, and having its feed-dog projecting beyond the end-wall, stitch-forming mechanism operating at the same end of the frame, close to the feeding mechanism and in front of the top-plate.

2. In combination with the frame of a sewing machine having a top-plate and an end wall formed integral; stitch-forming mechanism; feeding mechanism; and trimming mechanism including a trimmer-lever; the feeding mechanism being located at the extreme end of the machine-frame adjacent the end-wall and under the top-plate, the latter having an opening; and the trimming and stitch-forming mechanisms operating close beside the feeding mechanism; the trimmer-lever extending through the opening of the top-plate, being fulcrumed on the walls of said opening, and having a rigid blade-carrying arm overhanging the top-plate and the stitch-forming mechanism.

3. In combination with the frame of a sewing machine having a top-plate and integral end-wall, and a throat-plate extending from one corner of the top-plate; a feeding mechanism arranged under the top-plate and having a feed-dog operating through said throat-plate; a horn projecting from said frame in coöperative relation to said throat-plate to support the work; trimming mechanism having a member supported by said horn and a member supported on said top-plate; and stitch-forming mechanism having its executive elements operating beside the feed-dog and the blades of the trimmer-members.

4. In combination with a machine for producing blind overedge stitches, a trimming mechanism arranged at one extreme end of said machine and having its trimmer-blades arranged in advance of said stitching mechanism, a feeding mechanism for advancing the work to the trimming and then to the stitching mechanisms also arranged at said extreme end of the machine, and a work-support projecting laterally from said several mechanisms and from said extreme end of the machine.

5. In combination with the frame of a sewing machine, stitch-forming mechanism, feeding mechanism having its dog-supporting bar and its actuating connections arranged at one extreme end of said frame, a trimming mechanism having its movable-blade supporting-lever journaled in said frame directly above said feed-actuating connections, and a work-support projecting laterally from said frame and from the feeding, trimming and stitching positions.

6. In combination, stitch-forming mechanism; feeding mechanism; trimming mechanism; an edge-guide arranged in advance of the trimming mechanism, said edge-guide having an extension tapered toward and terminating in advance of the trimmer-blades and also having a lip overhanging the work-plate of the machine in advance of the trimmer-blades.

7. A stocking-welting machine having, in combination, a trimming mechanism and a feeding mechanism arranged at one extreme end of the frame thereof, said frame having a projecting work-support around which the work is fed, and a stitch-forming mechanism including a looper and spreader the driving elements of which are arranged along the length of the frame of the machine near the front of the latter, and the functional elements of which are arranged in intimate relation to the feeding and trimming mechanisms, and a cover-plate for shielding the said driving elements of the stitch-forming mechanism, said cover-plate having a guard and shunt coöperating with the trimming mechanism for disposing of the trimming of the work.

In testimony whereof I have hereunto signed my name in the presence of two subscribing witnesses.

JOHN P. WEIS.

Witnesses:
EDWARD RUSSELL,
JOHN W. KANE.